United States Patent [19]

Zimmerman et al.

[11] Patent Number: 4,818,610

[45] Date of Patent: Apr. 4, 1989

[54] UNIFIED PRESSURE-SENSITIVE ADHESIVE TAPE

[75] Inventors: Patrick G. Zimmerman, St. Paul; Gordon G. Johnson, Lake Elmo; Susan L. Korpela, St. Paul; Caroline L. Vernon, Stillwater, all of Minn.

[73] Assignee: Minnesota Mining and Manufacturing Company, St. Paul, Minn.

[21] Appl. No.: 84,781

[22] Filed: Aug. 17, 1987

Related U.S. Application Data

[63] Continuation-in-part of Ser. No. 900,372, Aug. 29, 1986, abandoned.

[51] Int. Cl.$^4$ .............................................. C09J 7/02
[52] U.S. Cl. .................................... 428/345; 428/343; 428/354; 428/355; 427/208.8
[58] Field of Search ............... 428/345, 343, 355, 420, 428/354; 427/208.8

[56] References Cited

U.S. PATENT DOCUMENTS

| | | | |
|---|---|---|---|
| Re. 24,906 | 12/1960 | Ulrich | 206/59 |
| 2,889,038 | 6/1959 | Kalleberg | 206/59 |
| 3,615,972 | 10/1971 | Morehouse et al. | 156/79 |
| 4,181,752 | 1/1980 | Martens et al. | 427/54.1 |
| 4,223,067 | 9/1980 | Levens | 428/308 |
| 4,287,308 | 9/1981 | Nakayama et al. | 521/53 |
| 4,303,485 | 12/1981 | Levens | 204/159.24 |
| 4,329,384 | 5/1982 | Vesley et al. | 428/40 |
| 4,330,590 | 5/1982 | Vesley | 428/336 |
| 4,379,201 | 4/1983 | Heilmann et al. | 428/345 |
| 4,391,687 | 7/1983 | Vesley | 204/159.16 |
| 4,415,615 | 11/1983 | Esmay et al. | 428/40 |
| 4,513,039 | 4/1985 | Esmay | 428/345 X |
| 4,522,870 | 6/1985 | Esmay | 428/252 |

*Primary Examiner*—George F. Lesmes
*Assistant Examiner*—Mitchell A. Katz
*Attorney, Agent, or Firm*—Donald M. Sell; Walter N. Kirn; Darla P. Neaveill

[57] ABSTRACT

A pressure-sensitive adhesive tape comprising a plurality of superimposed layers, at least one outer layer being a pressure-sensitive adhesive layer, contiguous layers defining an interface therebetween, each of the layers comprising a photopolymerized matrix of polymeric chains; the polymeric chains extending from the matrix of one of the layers through the interface into the matrix of a contiguous layer; the polymeric chains comprising polymerized monomers having migrated from the matrix of each contiguous layer prior to polymerization, whereby the layers cannot be delaminated.

14 Claims, 1 Drawing Sheet

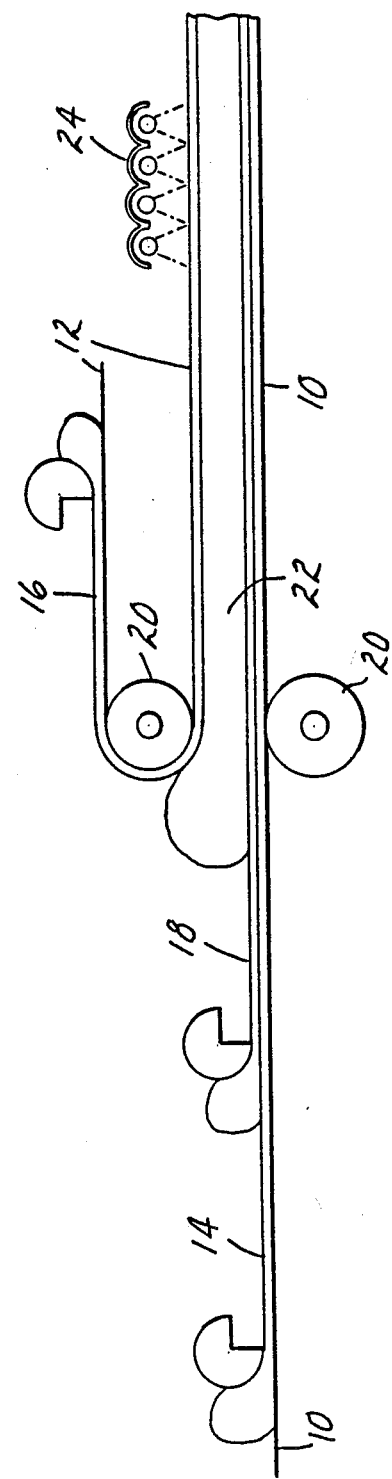

UNIFIED PRESSURE-SENSITIVE ADHESIVE TAPE

RELATED APPLICATIONS

This application is a continuation-in-part of U.S. Ser. No. 900,372 (Zimmerman et al.), filed on Aug. 29, 1986, now abandoned.

BACKGROUND OF THE INVENTION

1. Field of the Invention

The invention concerns photopolymerizable pressure-sensitive adhesive tapes comprising a plurality of contiguous layers which cannot be delaminated. Each of the layers comprises a photopolymerized matrix of polymeric chains, and at least one of the outer layers is photopolymerized to a pressure-sensitive adhesive state.

2. Description of the Related Art

The invention concerns photopolymerizable pressure-sensitive adhesive tapes, U.S. Pat. RE No. 24,906 (Ulrich), reissued on Dec. 20, 1960, discloses pressure-sensitive adhesive tapes, the adhesive layers of which comprise copolymers consisting essentially of monomers of acrylic acid esters of non-tertiary alkyl alcohols having from 1–14 carbon atoms, and at least one monomer copolymerizable therewith.

U.S. Pat. No. 4,181,752 (Martens et al.) discloses a process for making pressure-sensitive adhesive tape which involves the photopolymerization of the alkyl esters of acrylic acid and the modifying monomers to form the acrylate copolymers. It is also disclosed that the intensity and spectral distribution of the irradiation must be controlled in order to attain desirably high peel resistance and cohesive strength. The process disclosed is preferably carried out in the absence of oxygen and air which inhibit the polymerization reaction. Thus, it is normally carried out in an inert atmosphere such as nitrogen, carbon dioxide, helium, argon, etc. Air can also be excluded by sandwiching the liquid photopolymerizable mixture between layers of solid sheet material and irradiating through the sheet material. Each layer must be coated and cured before the addition of another layer.

One embodiment of a pressure-sensitive adhesive tape is commonly called a "transfer tape" in that it typically has a low-adhesion liner from which it is transferred when used. Such a tape can also be linerless as disclosed in U.S. Pat. Nos. 2,889,038 (Kalleberg) and 4,522,870 (Esmay). One embodiment of the invention, like the tape of U.S. Pat. No. 4,223,067 (Levens), has a foam-like appearance and character, even though it is not a foam.

The double-coated pressure-sensitive adhesive tape of U.S. Pat. No. 2,889,038, (Kalleberg) comprises a flexible support having on opposite faces chemically different pressure-sensitive adhesive layers which are physically incompatible, thus enabling the tape to be wound directly upon itself into a roll for storage and shipment. The tape is made by successively coating and drying solutions of two different pressure-sensitive adhesives onto opposite faces of a flexible web. To test for the incompatibility of the two pressure-sensitive adhesives, a solution of one of the pressure-sensitive adhesives is coated onto an undried coating of the other, and the coatings are simultaneously dried at room temperature for 24 hours to evaporate the solvents. Physical incompatibility is demonstrated by peeling the dried layers apart.

The double-coated pressure-sensitive adhesive tape of the above-cited Esmay patent is similar to that of the Kalleberg patent except that both adhesive faces can have truly high performance, and the adhesive layers at the two faces of the flexible web do not need to be either chemically different or physically incompatible. This is achieved when the pressure-sensitive adhesive at each of the faces is a polymer of predominantly alkyl acrylate, substantially solvent-free, and crosslinked. The Esmay patent states: "It is surmised that if the adhesive were not substantially solvent-free, the solvent would allow the polymer chains to knit across adjacent convolutions during prolonged storage in roll form, such that perfect separation could no longer be assured. In the present state of the art, it would not be commercially feasible to coat a pressure-sensitive adhesive from solution and obtain a pressure-sensitive adhesive layer which is substantially solvent-free. To keep the amount of solvent to a minimum, the (Esmay) tape is preferably made using photopolymerization as in U.S. Pat. No. 4,181,752 (Martens et al.)" (col. 2, lines 21–32).

The Esmay patent discloses that a "technique for enhancing immediate adhesion to relatively rough or uneven surfaces is to incorporate glass microbubbles into the pressure-sensitive adhesive as taught in U.S. Pat. No. 4,223,067 (Levens)" (col. 4, lines 31,35). Because the microbubble-containing tape of the Levens patent has a foam-like appearance and character, it is sometimes called a "foam-like" tape even though its pressure-sensitive adhesive layer is substantially free of voids except for the hollow spaces within the microbubbles. The Levens patent in turn teaches that where it is desired to adhere the foam-like tape "to a surface to which its pressure-sensitive adhesive layer would not form a strong bond, it may be desirable to apply to one or both of its faces of its microbubble-filled adhesive layer a layer of unfilled pressure-sensitive adhesive which is especially selected for adhesion to that surface" (col. 4, lines 9–15). Such microbubble-free surface layers can also provide substantially increased cohesive strength, especially at high temperatures. Multiple microbubble-free surface layers can have different adhesive properties, each selected for good adhesion to a certain surface. Because the application of those added layers substantially increase the cost of the foam-like tape, less expensive foam-backed tapes have dominated the market for uses requiring immediate adhesion to rough or uneven surfaces.

The microbubbles can be glass as in the examples of the Levens patent, or they can be polymeric as described in U.S. Pat. No. 3,615,472 (Morehouse et al.) or U.S. Pat. No. 4,287,308 (Nakayama et al.).

SUMMARY OF THE INVENTION

A pressure-sensitive adhesive tapes comprising a plurality of superimposed layers, at least one outer layer being a pressure-sensitive adhesive layer, contiguous layers defining an interface therebetween, each of said layers comprising a photopolymerized matrix of polymeric chains; said polymeric chains extending from the matrix of one of said layers through said interface into the matrix of a contiguous layer; said polymeric chains comprising polymerized monomers having migrated from the matrix of each contiguous layer prior to polymerization, whereby said layers cannot be delaminated.

The novel product differs from other tapes of the prior art in that the monomers of the pressure-sensitive adhesive matrix migrate across the interface prior to polymerization so that after polymerization the interface comprises a substantial amount of monomers from both sides of the interface. This yields layers which cannot be physically delaminated.

The present invention embraces a variety of embodiments. One group of preferred embodiments of the present invention is that of pressure-sensitive adhesive tapes which are at least equal in performance to multilayer foam-like tapes of the Levens patent, but can be produced at significantly lower cost. A second group of preferred embodiments is that of cost-effective, double-coated, pressure-sensitive adhesive tapes. Such tapes may have identical or differing adhesives at each surface. Such tapes may further comprise one or more non-adhesive layers selected from a multitude of polymeric matrices, i.e., flexible or foam-like supports between the adhesive layers, or releasable liners.

As used herein, the term "tape" includes but is not limited to, those adhesive strips which are single-coated adhesive layers permanently attached to a backing or support, double-coated adhesive strips having flexible supports with an adhesive layer on both sides thereof, and adhesive strips with no support or backing, such being typically though not necessarily releasably attached to a low-adhesion liner, and commonly called "transfer tapes".

The present invention also relates to a process for making a pressure-sensitive adhesive tape comprising the steps of:

(1) preparing a plurality of coatable compositions, each of said coatable compositions comprising at least one photopolymerizable monomer; at least one of said coatable compositions being curable to a pressure-sensitive adhesive state, monomers of each of said coatable compositions being copolymerizable when blended and subjected to photopolymerization conditions;

(2) sequentially coating said coatable compositions to provide a plurality of superimposed layers with contiguous layers defining an interface therebetween, with one composition which is curable to a pressure-sensitive adhesive state being coated as a first or last layer;

(3) permitting migration of photopolymerizable monomers through said interface between contiguous layers; and (4) subjecting said superimposed layers to irradiation to simultaneously photopolymerize said monomers in each layer, and to provide polymeric chains comprised of copolymers of photopolymerizable monomers originating from contiguous layers extending through said interface therebetween; thereby to produce a tape having layers which cannot be delaminated.

All parts, percentages and ratios described herein are by weight unless otherwise identified.

DETAILED DESCRIPTION OF THE INVENTION

Each of the layers of tapes of the invention comprises a photopolymerizable matrix comprising polymeric chains. These matrices may comprise a multitude of polymers; however, all polymers used in such matrices must be photopolymerizable, preferably by the ultraviolet portion of the spectrum (220–440 nm). At least one layer must be photopolymerizable to a pressure-sensitive adhesive state.

Such pressure-sensitive adhesive layer of the novel tape has a photopolymerizable matrix preferably comprising an acrylic pressure-sensitive adhesive.

The acrylic pressure-sensitive adhesives useful in the present invention are alkyl acrylates, preferably monofunctional unsaturated acrylate esters of non-tertiary alkyl alcohols, the molecules of which have from 1 to about 14 carbon atoms. Included within this class of monomers are, for example, isooctyl acrylate, isononyl acrylate, 2-ethyl-hexyl acrylate, decyl acrylate, dodecyl acrylate, n-butyl acrylate, and hexyl acrylate. Preferred monomers include isooctyl acrylate, isononyl acrylate, and butyl acrylate. The alkyl acrylate monomers can be used to form homopolymers for the photopolymerizable polymer or they can be copolymerized with polar copolymerizable monomers. When copolymerized with strongly polar copolymerizable monomers, the alkyl acrylate monomer generally comprises at least about 75% of the photopolymerizable polymers. When copolymerized with moderately polar copolymerizable monomers, the alkyl acrylate monomer generally comprises at least about 70% of the photopolymerizable polymer.

The polar copolymerizable monomers can be selected from strongly polar copolymerizable monomers such as acrylic acid, itaconic acid, hydroxyalkyl acrylates, cyanoalkyl acrylates, acrylamides or substituted acrylamides, or from moderately polar copolymerizable monomers such as N-vinyl pyrrolidone, acrylonitrile, vinyl chloride or diallyl phthalate. The strongly polar copolymerizable monomer preferably comprises up to about 25%, more preferably up to about 15%. The moderately polar copolymerizable monomer preferably comprises up to about 30%, more preferably from 5% to about 30% of the photopolymerizable polymer.

Where superior cohesive strengths are desired, the pressure-sensitive adhesive matrix of the novel tape should be cross-linked. Preferred crosslinking agents for an acrylic pressure-sensitive adhesive are multiacrylates such as 1,6-hexanediol diacrylate as disclosed in U.S. Pat. No. 4,379,201 (Heilman et al.), incorporated herein by reference. Crosslinking is especially easy to control when photopolymerizing the monomer in admixture with a multiacrylate crosslinking agent. Other types of crosslinking agents are also useful, e.g., any of those taught in U.S. Pat. Nos. 4,330,590 (Vesley), and 4,329,384 (Vesley et al.), both of which are incorporated by reference. Each of the crosslinking agents is useful in the range of from about 0.01% to about 1% of the total weight of the monomers.

Among pressure-sensitive adhesives which are useful for the pressure-sensitive adhesive layer of the novel tape are those which become tacky only at elevated temperatures, e.g., acrylic copolymers having average carbon-to-carbon chains of less than 4 carbon atoms or those comprising a polymer wherein methacrylic acid esters are substituted for portions of acrylic acid esters.

Tapes of the invention may comprise more than one pressure-sensitive adhesive layer. In such tapes, the pressure-sensitive adhesive layers may comprise similar or different adhesives, in like or unlike thicknesses, having similar or different additives.

Where a foam-like pressure-sensitive adhesive tape is desirable, e.g.,in those applications requiring adhesion to low energy substrates such as polyethylene and polypropylene, and high solids automotive paint systems, a monomer blend comprising microbubbles may be used as a backing or core layer. The microbubbles may be glass as taught in the Levens patent, supra, or they may be polymeric. The microbubbles should have an average diameter of 10 to 200 micrometers, and comprise from about 5 to about 65 volume percent of the pressure-sensitive adhesion layer. The thickness of the foam-like layer should be at least six times, preferably at least 20 times that of each microbubble-free layer. The thickness of the layer should exceed three times the average diameter of the microbubbles and twice the diameter of substantially every microbubble. The thickness of foam-like layers in preferred tapes of the invention range from 0.3 mm to about 4.0 mm in thickness.

When a microbubble-free pressure-sensitive adhesive tape is desired to be provided on a substantially non-tacky flexible support film, the film layer can comprise substantially the same monomers described for the pressure-sensitive adhesive layer, with different ratios of the acrylic acid ester of non-teriary alcohol and at least one polar copolymerizable monomer. The preferred range of the polar copolymerizable monomer in such a layer ranges from 20% to about 60% of the total monomer mix. Such layer may also comprise a crosslinking agent and other photopolymerizable ingredients including, but not limited to alkyl vinyl ethers, vinylidene chloride, styrene, and vinyl toluene, only in amounts that do not detract from the desired properties.

Other materials which can be blended with the polymerizable monomer mixture include tackifiers, plasticizers, reinforcing agents, dyes, pigments, fibers and fire retardants.

Tapes of the invention may also comprise a woven or nonwoven scrim. Presence of such a scrim will not inhibit migration of the monomers from one layer through an interface to a contiguous layer of the tape.

The present invention also relates to a process for making the pressure-sensitive adhesive tape of the invention, comprising the steps of:

(1) preparing a plurality of coatable compositions, each of the coatable compositions comprising at least one photopolymerizable monomer; at least one of the coatable compositions being curable to a pressure-sensitive adhesive state, monomers of each of said coatable compositions being copolymerizable when blended and subjected to photopolymerization conditions;

(2) sequentially coating said coatable compositions to provide a plurality of superimposed layers with contiguous layers defining an interface therebetween, with one composition which is curable to a pressure-sensitive adhesive state being coated as a first or last layer;

(3) permitting migration of photopolymerizable monomers through said interface between contiguous layers; and (4) subjecting said superimposed layers to irradiation to simultaneously photopolymerize said monomers in each layer, and to provide polymeric chains comprised of copolymers of photopolymerizable monomers originating from contiguous layers extending through said interface therebetween; thereby to produce a tape having layers which cannot be delaminated.

A single-coated pressure-sensitive tape of the invention may be made by the process above applying the first layer to a low-adhesion carrier, such first layer being photopolymerizable to a pressure-sensitive adhesive state, then applying one or more contiguous layers of a monomer blend which is photopolymerizable to a non-tacky film, and copolymerizable with the first layer. A double-coated tape may be made by following these steps with the application of a second layer which is photopolymerizable to a pressure-sensitive adhesive state. The monomers for the pressure-sensitive adhesive layers may be identical, or may be selected to provide differing specific adhesive properties at each surface of the tape.

A foam-like pressure-sensitive adhesive tape of the invention may be made by a process of the invention comprising the steps of:

(1) preparing a coatable composition having ultraviolet-transparent microbubbles dispersed therein which comprises at least one monomer photopolymerizable to a pressure-sensitive adhesive state;

(2) preparing one or more coatable compositions which are microbubble-free, and comprises at least one photopolymerizable monomer, said monomer being copolymerizable with the monomer in step 1 when blended and subjected to photopolymerization conditions;

(3) sequentially coating said coatable compositions of step 1, and step 2 onto a low-adhesion carrier to form superimposed layers, contiguous layers defining an interface therebetween;

(4) permitting migration of photopolymerizable monomers through said interface between said contiguous layers; and (5) subjecting said superimposed layers to irradiation to simultaneously photopolymerize the monomers in each layer, and to provide polymeric chains of copolymers of polymerizable monomers originating from contiguous layers extending through the interface therebetween, thereby to produce a tape having layers which cannot be delaminated. In this process as well as the more general process described above, monomers from each contiguous layer have migrated across the interface, so that after polymerization, a matrix of polymeric chains extends across the interface, substantially comprising monomers from each of the contiguous layers. It is the formation of such polymeric chains that prevents the layers from being delaminated. Generally, in the preferred foam-like pressure-sensitive adhesive tapes of the invention, the layer containing the microbubbles is much thicker than the microbubble-free layer. In an alternate process of making a foam-like tape of the invention, step (3) of the above-outlined process may involve first applying a thin layer of a microbubble-free coatable composition onto the low-adhesion carrier; second, applying a thick coating of the coatable composition containing microbubbles; and third, applying a thin coating of a microbubble-free coatable composition over such layer. After simultaneously irradiating these coatings, the resulting pressure-sensitive adhesive layer has a thick foam-like core and thin microbubble-free portion at each of its two surfaces. In this tape, as in all double-coated tapes of the invention, compositions comprising different photopolymerizable monomers may be used in the first and third layers where such would be advantageous for the application desired.

The coatable compositions used in tapes of the invention, especially the pressure-sensitive compositions are preferably prepared by premixing together the photopolymerizable monomers and the polar copolymerizable monomer, if used, and photoinitiator. This premix is then partially polymerized to a viscosity in the range of from about 500 cps to about 50,000 cps to achieved a coatable syrup. Alternatively, the monomers can be mixed with a thixotropic agent such as fumed silica to achieve a coatable syrup composition.

Photopolymerization is preferably carried out in an inert atmosphere, such as nitrogen. An inert atmosphere can be achieved by temporarily covering the photopolymerizable coating with a plastic film which is transparent to ultraviolet radiation, and irradiating through the film in air. If the photopolymerizable coating is not covered during photopolymerization, the permissible oxygen content of the inert atmosphere can be increased by mixing the coating with a combustible tin compound as taught in U.S. Pat. No. 4,303,485 (Levens), which also teaches such technique for making thick coatings in air.

BRIEF DESCRIPTION OF THE DRAWING

In the drawing, the single figure schematically illustrates the manufacture of a preferred pressure-sensitive adhesive tape of the invention.

As shown in the drawing, onto ultraviolet-transparent, low-adhesion carriers 10 and 12 are respectively knife-coated coatings 14 and 16, each comprising a syrup consisting of a monomer blend which is photopolymerizable to a pressure-sensitive adhesive state. Over the photopolymerizable coating 14 is knife-coated a very thin coating 8 of monomer which is copolymerizable with monomer of the coating 14 and can act as a barrier to migration of monomer into the coating 14 from the next coating 22 which is thickly applied at the nip of a pair of rollers 20. The coating 22 is a mixture of ultraviolet-transparent microbubbles dispersed in monomer which is both photopolymerizable to a pressure-sensitive adhesive state and copolymerizable with monomers of each of the coatings 14, 16 and 18. Emerging from the rollers 20 are the two low-adhesion carriers 10 and 12, between which are the four coatings 14, 16, 18 and 22 which are simultaneously subjected to ultraviolet radiation from a bank of lamps 24, thus photopolymerizing the monomers to provide a layer of pressure-sensitive adhesive which comprises a matrix of polymeric chains that extends across the interfaces between a thick microbubble-filled core and the two microbubble-free surface portions resulting from the polymerization of the coatings 14 and 16.

The carrier 10, instead of being low-adhesion, can have an adhesion-promoting treatment, if necessary, in order to create a permanent bond between the pressure-sensitive adhesive layer and the carrier. A permanently bonded carrier can be selected to provide a tape affording good abrasion resistance and/or corrosion resistance and/or environmental protection. A permanently bonded carrier can be a hot-melt adhesive by which the pressure-sensitive adhesive layer can be bonded to a substrate such as gasketing rubber. For any of these uses, the tape may or may not include the thick coating 22.

T-PEEL

T-Peel is measured as in ASTM D-1876-72 except that the test tapes were 0.5-inch (1.27 cm) in width and were tested after being adhered to aluminum foil backings for two hours. Results are reported in Newtons per decimeter (N/dm). Only cohesive failures are reported.

T-Peel provides a quantitative value of cohesive strength and is less sensitive to differences in the adhesion of the pressure-sensitive adhesive to the test surface.

180° Peel Adhesion

The adhesive layer to be tested is transferred to 0.05-mm thick, chemically primed, biaxially oriented poly(ethylene terephthalate) film which then is slit to a width of ½ inch (1.27 cm). The resulting tape is self-adhered to plate glass under the weight of a 2.04-kg hard-rubber-covered steel roller, 2 passes in each direction. After dwelling at 23° C. for about 5 minutes, "180° Peel Adhesion" is measured by moving the free end of the tape away from the glass parallel to the surface of the glass at a rate of about 0.5 cm per second (using a tensile tester).

90° Peel Adhesion

The adhesive layer to be tested is transferred to 0.05-mm thick, chemically primed, biaxially oriented poly(ethylene terephthalate) film which then is slit to a width of ½ inch (1.27 cm). The resulting tape is self-adhered to a smooth stainless steel plate under the weight of a 2.04-kg hard-rubber-covered steel roller, 2 passes in each direction. After exposure to the indicated conditions, "90° Peel Adhesion" is measured by moving the free end of the tape away from the steel plate at 90° and at a rate of about 0.5 cm per second (using a tensile tester).

Holding Power

This test employs two 25.4-mm wide stainless steel straps as follows: Type 304-2BA, 0.38 mm in thickness, surface roughness 0.05 micrometer arithmetic average deviation from the main line. The strips are washed with heptane (also with MEK if heavy oils are present). A strip of 25.4-mm wide double-coated pressure-sensitive adhesive tape, carried on a low-adhesion liner, is adhered to one end of one of the straps and trimmed to a length of 25.4-mm. The liner is then removed, and the other strap adhered to the exposed adhesive surface. The specimen is placed in a horizontal position and rolled down with a 6.8-kg (15-lb.) roller to ensure intimate contact between the surfaces. After dwelling at room temperature for 24 hours, the assembly is hung in a 121° C. oven from one strap with a weight attached to the other strap, and the time at which the weight falls is recorded. The time of failure is indicative of the "Holding Power" of the double-coated pressure-sensitive adhesive tape. If no failure occurs, the test is discontinued after 24 hours.

Static Shear Test

An assembly is prepared as in the test for Holding Power except that instead of using a roller, a 1-kg weight rests on the assembly for 15 minutes at room temperature. Then the panel with the adhered tape is placed in an air-circulating oven which has been preheated to the indicated temperature, and after 15 minutes, a weight is hung from the free end of the tape, with the top strap vertical. The time at which the weight falls is the "Static Shear Value". If no failure, the test is discontinued at 10,000 minutes (in the 70° C. test) or sometimes at 1440 minutes (in the 121° C. test). Only cohesive failures are reported.

Delamination Test

A specimen of the tape is immersed in a bath of ethyl acetate at ordinary room temperature, then visually examined periodically. Any visual evidence of delamination is reported as a failure. The test is discontinued if there has been no failure after 24 hours.

In the following examples, parts are given by weight. The glass microbubbles used in the examples had a density of 0.15 g/cm$^3$ and were 20–150 micrometers in diameter (average 55 micrometers).

EXAMPLE 1

A syrup was prepared from 87.5 parts of isooctyl acrylate and 12.5 parts of acrylic acid with 0.04 phr "Irgacure" 651, infra, which had been partially polymerized by ultraviolet radiation to a viscosity of 3600 cps (Brookfield), an inherent viscosity of the polymer being 2.84 and a degree of polymerization of 8%. After adding 0.1 phr (phr—parts per hundred syrup) of 2,2-dimethoxy-2-phenyl acetophenone photoinitiator ("Irgacure" 651), 0.056 phr of hexanediol diacrylate crosslinking agent, and 8 phr of glass microbubbles, the mixture was thoroughly mixed with a propeller mixer at 500 rpm for ten minutes and then carefully degassed in a desiccator using a vacuum pump.

A microbubble-free monomer blend of 90 parts isooctyl acrylate and 10 parts acrylic acid (and 0.04 phr "Irgacure" 651) was partially polymerized by ultraviolet irradiation to a degree of polymerization of about 6–10%, followed by the addition of the same photoinitiator and a crosslinking agent, mixing, and degassing. The crosslinking agent used in the microbubble free monomer blend was Photoactive Triazine B of U.S. Pat. No. 4,391,687 (Vesley), and its amount was 0.15 phr.

Pressure-sensitive adhesive tapes were prepared as illustrated in the drawing except omitting the coating 18. Used for the low-adhesion carriers 10 and 12 were a pair of transparent, biaxially oriented poly(ethylene terephthalate) films, the facing surfaces of which had low-adhesion silicone coatings. The thicknesses of the coatings were:

coatings 14 and 16 (microbubble-free blend) 0.05 mm
coatings 22 (microbubble-filled mixture) 1.0 mm The composite emerging from the roller 20 was irradiated with an exposure of 410 mJ/cm$^2$ (Dynachem Radiometer Model 500) from a bank of lamps, 90% of the emissions of which were between 300 and 400 nm with a maximum at 351 nm. The composite was cooled by blowing air against both films during the irradiation to keep the temperature of the films below 85° C. to avoid wrinkling of the films.

Comparative Example 1

A double-coated, foam-like pressure-sensitive adhesive tape was made like that of Example 1 except as follows:

(1) the microbubble-filled mixture was coated and polymerized by itself;

(2) the microbubble-free monomer blend was coated onto a low-adhesion carrier and photopolymerized to provide a transfer tape; and (3) a length of the transfer tape was hot-laminated onto the microbubble-filled layer.

The hot lamination was carried out between two rollers, one steel internally heated to 150° C. and the other covered with silicone rubber. The rollers were spaced 0.5 mm apart and were driven at 30 cm/min. The silicone rubber covering had been selected to apply maximum pressure with substantially no microbubble breakage.

The crosslinked double-coated pressure-sensitive adhesive tapes of Example 1 and Comparative Example 1 were tested as reported in Table I.

TABLE I

| | Examples: | |
|---|---|---|
| | 1 | Comp. 1 |
| 90° Peel Adhesion (N/dm) | | |
| RT for 20 min. | 103 | 44 |
| RT for 72 hr. | 226 | 42 |
| 38° C. 100% RH for 72 hr. | 174 | 57 |
| Holding Power (minutes) | | |
| 1-kg weight | 1440 | 57 |
| Static Shear Test (minutes) | | |
| 500 g weight/70° C. | 3000 | 154 |
| 250 g weight/121° C. | 1440 | <1440 |
| Delamination Test (minutes) | Passed | 30 |

EXAMPLE 2

A double-coated pressure-sensitive adhesive tape was made as in Example 1 except as follows. There was only one microbubble-free coating, and it was partially polymerized 70/30 isooctyl acrylate/N-vinyl-2-pyrrolidone. A 0.025 mm coating (coating 18 of the Drawing) of partially polymerized isooctyl acrylate was interposed between that coating and the core.

EXAMPLE 3

A double-coated pressure-sensitive adhesive tape was made as in Example 2 except omitting the coating 18 of partially polymerized isooctyl acrylate. Test results for tapes of Examples 2 and 3 are reported in Table II.

TABLE II

| | Examples: | |
|---|---|---|
| 90° Peel Adhesion (N/dm) | 2 | 3 |
| RT for 20 min. | 43 | 22 |
| RT for 24 hours | 153 | 91 |
| RT for 72 hours | 131 | 66 |

EXAMPLE 4

Comparative Example 4

Double-coated, pressure-sensitive adhesive tapes were made as in Example 1 and Comparative Example 1 except as follows: Each microbubble-filled mixture was frothed as in the "Typically Tape-making Procedure" of U.S. Pat. No. 4,415,615, and there was only one coating of the microbubble-free monomer blend. Test results are reported in Table III.

TABLE III

| | Examples: | |
|---|---|---|
| | 4 | Comp. 4 |
| 90° Peel Adhesion (N/dm) | | |
| RT for 20 min. | 83 | 82 |
| RT for 72 hr. | 136 | 146 |
| Static Shear Test (minutes) | | |
| 500 g weight/70° C. | >10,000 | 4747 |
| 250 g weight/121° C. | 6,000 | 4200 |
| Delamination Test (minutes) | Passed | 30 |

EXAMPLES 5–7

Three pressure-sensitive adhesive tapes (transfer tapes) were prepared from two unfilled, partially polymerized monomer blends using the following monomers:

| | |
|---|---|
| isooctyl acrylate | IOA |

| | |
|---|---|
| butyl acrylate | BA |
| acrylic acid | AA |
| N—vinyl-2-pyrrolidone | NVP |

Each of the monomer blends was partially polymerized in the same way as was the microbubble-free blend of Example 1 except that the crosslinking agent of the IOA/AA/BA coating of Example 5 was 0.1 phr hexanediol diacrylate. As in Example 1, each of the coatings was 0.05 mm in thickness. In each case, the two blends were coated sequentially onto biaxially oriented poly(ethylene terephthalate) film and irradiated as in Example 1 except in a nitrogen atmosphere and at an exposure of 220 mj/cm$^2$. Upon thus being photo-polymerized, polymeric chains were formed which extended across the interface between the two coatings of each of the tapes.

The tapes of Examples 5–7 were tested for 180° Peel Adhesion with results as indicated in Table IV.

TABLE IV

| Example | Monomers for each coating | 180° Peel Adhesion (N/dm) |
|---|---|---|
| 5 | 98/2 IOA/AA | 16 |
|   | 70/15/15 IOA/AA/BA | 24 |
| 6 | 70/30 IOA/NVP | 50 |
|   | 90/10 IOA/AA | 37 |
| 7 | 100 IOA | 8 |
|   | 80/20 IOA/AA | 24 |

Each of the tapes of Examples 5–7 was subjected to the Delamination Test, and none of them failed.

Each of of these tapes can be applied to a backing which provides good abrasion resistance, corrosion resistance, or environmental protection. In doing so, the face of the pressure-sensitive adhesive layer of the tape that better adheres to that backing would be applied to the backing. To reduce production costs, the pressure-sensitive adhesive layer of each of those tapes could be formed directly upon the backing instead of using the poly(ethylene terephthalate) film.

We claim:

1. A pressure-sensitive adhesive tape comprising a plurality of superimposed layers, contiguous layers comprising differing acrylic compositions, said layers having been simultaneously photopolymerized, at least one outer layer being an acrylic pressure-sensitive adhesive layer, said layer comprising at least one alkyl acrylate ester of a nontertiary alkyl alcohol, and a photoinitiator, contiguous layers defining an interface therebetween, each of said layers comprising a photopolymerized matrix of polymeric chains; said polymeric chains extending through said interface into the matrix of a contiguous layer; said polymeric chains comprising polymerized monomers having migrated from the matrix of each contiguous layer prior to polymerization, whereby said contiguous layers cannot be delaminated.

2. A pressure-sensitive adhesive tape according to claim 1 wherein the pressure-sensitive adhesive layer further comprises at least one polar copolymerizable monomer.

3. A pressure-sensitive adhesive tape according to claim 2 wherein said adhesive copolymer comprises (a) from about 40% to about 80% isooctyl acrylate; and (b) from about 20% to about 60% of a polar copolymerizable monomer selected from the group consisting of N-vinyl pyrrolidone and acrylic acid.

4. A pressure-sensitive adhesive tape according to claim 1 wherein said superimposed layers include an outer pressure-sensitive adhesive layer and at least one layer of substantially non-tacky polymeric material.

5. A pressure-sensitive adhesive tape according to claim 4 wherein said substantially non-tacky polymeric material comprises photopolymerized polymeric matrix selected from the group consisting of polymers of multifunctional acrylates and copolymers of monomers comprising acrylic acid esters of non-tertiary alkyl alcohol having from 1 to about 14 carbon atoms and at least one polar copolymerizable monomer.

6. A pressure-sensitive adhesive tape according to claim 5 wherein said substantially non-tacky polymeric material comprises at least one copolymer of monomers comprising (a) from about 40% to about 80% of acrylic acid ester of non-tertiary alcohol, the molecules of which have from 1 to about 14 carbon atoms; and (b) from about 20% to about 60% of at least one polar copolymerizable monomer.

7. A pressure-sensitive adhesive tape according to claim 1 wherein at least one of said layers further comprise from about 5% to about 65% volume percent microbubbles having a specific gravity of no more than 1.0.

8. A pressure-sensitive adhesive tape according to claim 1 wherein each outer layer is a pressure-sensitive adhesive layer.

9. A pressure-sensitive adhesive tape according to claim 8 having outer layers comprised of photopolymerized polymeric pressure-sensitive adhesive and at least one intermediate layer photopolymerized non-tacky polymeric material, wherein each of said layers comprises a copolymer of monomers comprising:

(a) a major proportion of an acrylic acid ester of non-tertiary alkyl alcohol, the molecules of which have from 1 to 14 carbon atoms; and (b) a minor proportion of a polar copolymerizable monomer selected from the group consisting of N-vinyl pyrrolidone and acrylic acid.

10. A pressure-sensitive adhesive tape according to claim 8 wherein each of said pressure-sensitive adhesive outer layers comprises a copolymer having at least one photopolymerizable monomer not present in the other pressure-sensitive adhesive outer layer.

11. A pressure-sensitive adhesive tape according to claim 9 wherein the polar copolymerizable monomer (b) in one of said pressure-sensitive adhesive layers is acrylic acid, and the polar copolymerizable monomer (b) in the other of said pressure-sensitive adhesive layer is N-vinyl pyrrolidone.

12. A pressure-sensitive adhesive tape according to claim 9 wherein said layer photopolymerized to a non-tacky polymeric material further compriss from about 5% by volume to about 65% by volume microbubbles having a specific gravity of 1.0 or less.

13. A unified pressure-sensitive adhesive tape according to claim 1 further comprising a scrim.

14. A unified pressure-sensitive adhesive according to claim 13 wherein said scrim is non-woven.

* * * * *

UNITED STATES PATENT AND TRADEMARK OFFICE
CERTIFICATE OF CORRECTION

PATENT NO. : 4,818,610

DATED : April 4, 1989

INVENTOR(S) : Zimmerman et al.

It is certified that error appears in the above-identified patent and that said Letters Patent is hereby corrected as shown below:

Column 2, line 51 "3,615,472" should be --3,615,972--.

Column 7, line 20, "8" should be --18--.

Signed and Sealed this

Twenty-eighth Day of November 1989

Attest:

JEFFREY M. SAMUELS

Attesting Officer     Acting Commissioner of Patents and Trademarks